(12) United States Patent
Giovannetti

(10) Patent No.: US 12,433,405 B2
(45) Date of Patent: Oct. 7, 2025

(54) DEVICE FOR SUPPORT AND REMOVABLE FIXING OF SHELVES TO THE UPRIGHTS OF A FURNITURE ITEM

(71) Applicant: EFFEGI BREVETTI S.R.L., Segrate (IT)

(72) Inventor: Antonio Giovannetti, Segrate (IT)

( * ) Notice: Subject to any disclaimer, the term of this patent is extended or adjusted under 35 U.S.C. 154(b) by 282 days.

(21) Appl. No.: 18/262,283

(22) PCT Filed: Jan. 11, 2022

(86) PCT No.: PCT/EP2022/050425
§ 371 (c)(1),
(2) Date: Jul. 20, 2023

(87) PCT Pub. No.: WO2022/167175
PCT Pub. Date: Aug. 11, 2022

(65) Prior Publication Data
US 2024/0074581 A1    Mar. 7, 2024

(30) Foreign Application Priority Data

Feb. 2, 2021   (IT) ................. 102021000002174

(51) Int. Cl.
*A47B 57/20*    (2006.01)
*A47B 96/06*    (2006.01)

(52) U.S. Cl.
CPC ............ *A47B 96/066* (2013.01); *A47B 57/20* (2013.01)

(58) Field of Classification Search
CPC ......... A47B 57/20; A47B 57/22; A47B 96/06; A47B 96/066; F16B 12/20; F16B 12/22; F16B 12/24; F16B 12/26
See application file for complete search history.

(56) References Cited

U.S. PATENT DOCUMENTS 3,650,588 A * 3/1972 Helland ................. A47B 57/20
                                                          211/126.15
3,750,238 A * 8/1973 Tanner .................. A47B 57/20
                                                          312/351
(Continued)

FOREIGN PATENT DOCUMENTS

| EP | 3131438 B1 | 7/2019 |
| IT | UA20162229 A1 | 10/2017 |
| WO | 2021254665 A1 | 12/2021 |

OTHER PUBLICATIONS

International Search Report for corresponding PCT/EP2022/050425 dated Apr. 20, 2022.

(Continued)

*Primary Examiner* — Daniel J Wiley
(74) *Attorney, Agent, or Firm* — Egbert, McDaniel & Swartz, PLLC

(57) ABSTRACT

A device for supporting and removably fixing shelves of furniture, such as bookcases, shelf units and the like, by a pin associated with a shelf and configured to be inserted in a hole formed in a side wall of a furniture item. The device is configured to be inserted in the thickness of the shelf and has a casing, inside whereof the pin is mounted, ending with a head, which is stressed by a compression spring, to protrude normally from the edge of the shelf. The casing has a substantially flattened parallelepiped shape and said pin is mounted so as to be able to retract completely in the casing with a linear movement following a force exerted axially on the same, and to be able to retract at last partially in the casing with an oblique movement following a transverse force exerted on the same.

8 Claims, 15 Drawing Sheets

(56) References Cited

U.S. PATENT DOCUMENTS

| | | | |
|---|---|---|---|
| 10,034,542 B2* | 7/2018 | Giovannetti | A47B 47/0091 |
| 2020/0331106 A1* | 10/2020 | Caputo | F16B 12/26 |
| 2023/0248147 A1* | 8/2023 | Giovannetti | F16B 12/2027 |
| | | | 248/205.1 |
| 2023/0404262 A1* | 12/2023 | Cattaneo | F16B 12/24 |
| 2024/0237822 A1* | 7/2024 | Sawatzki | F16B 12/26 |
| 2024/0260755 A1* | 8/2024 | Giovannetti | A47B 96/066 |

OTHER PUBLICATIONS

Written Opinion of the International Searching Authority for corresponding PCT/EP2022/050425 dated Apr. 20, 2022.

* cited by examiner

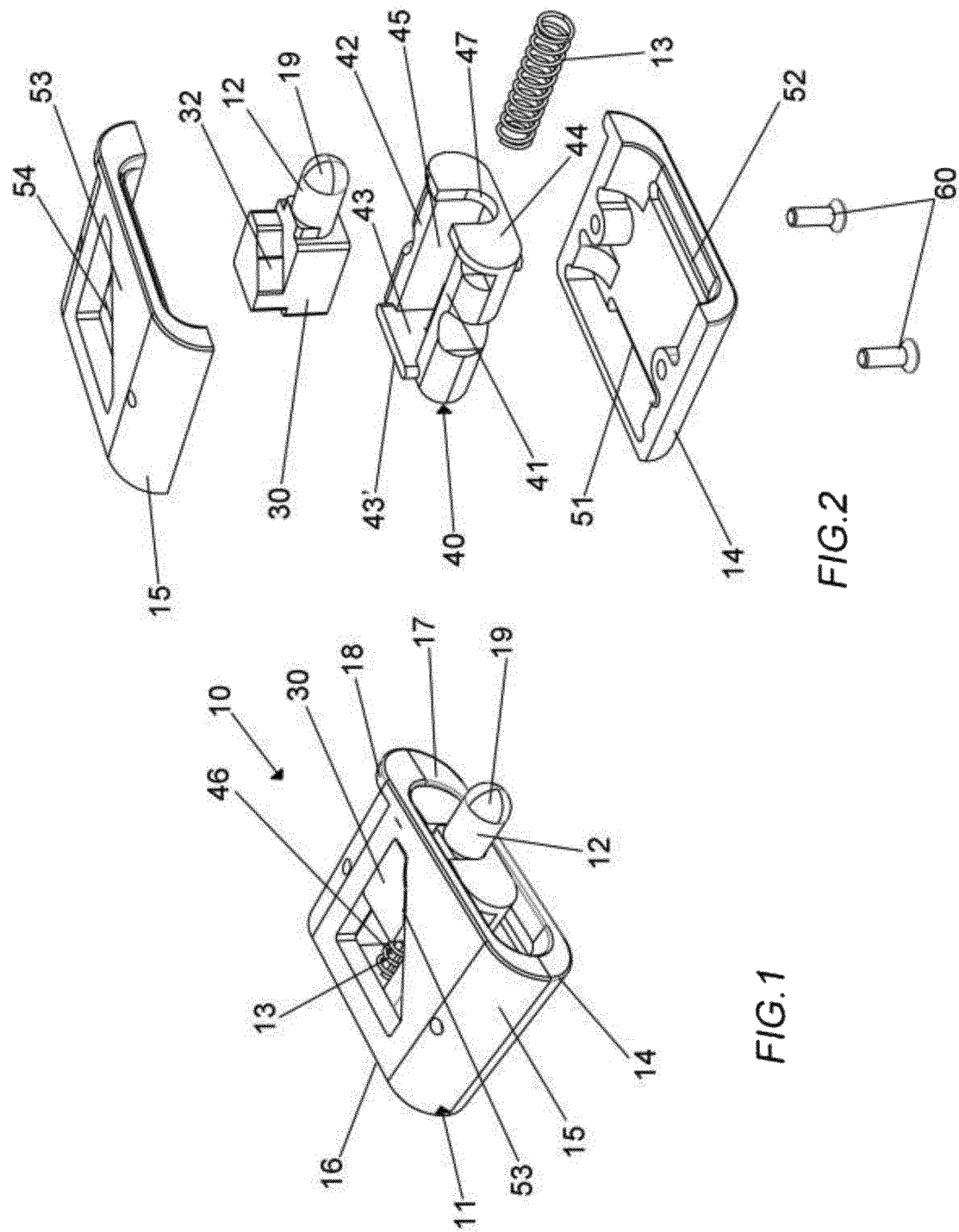

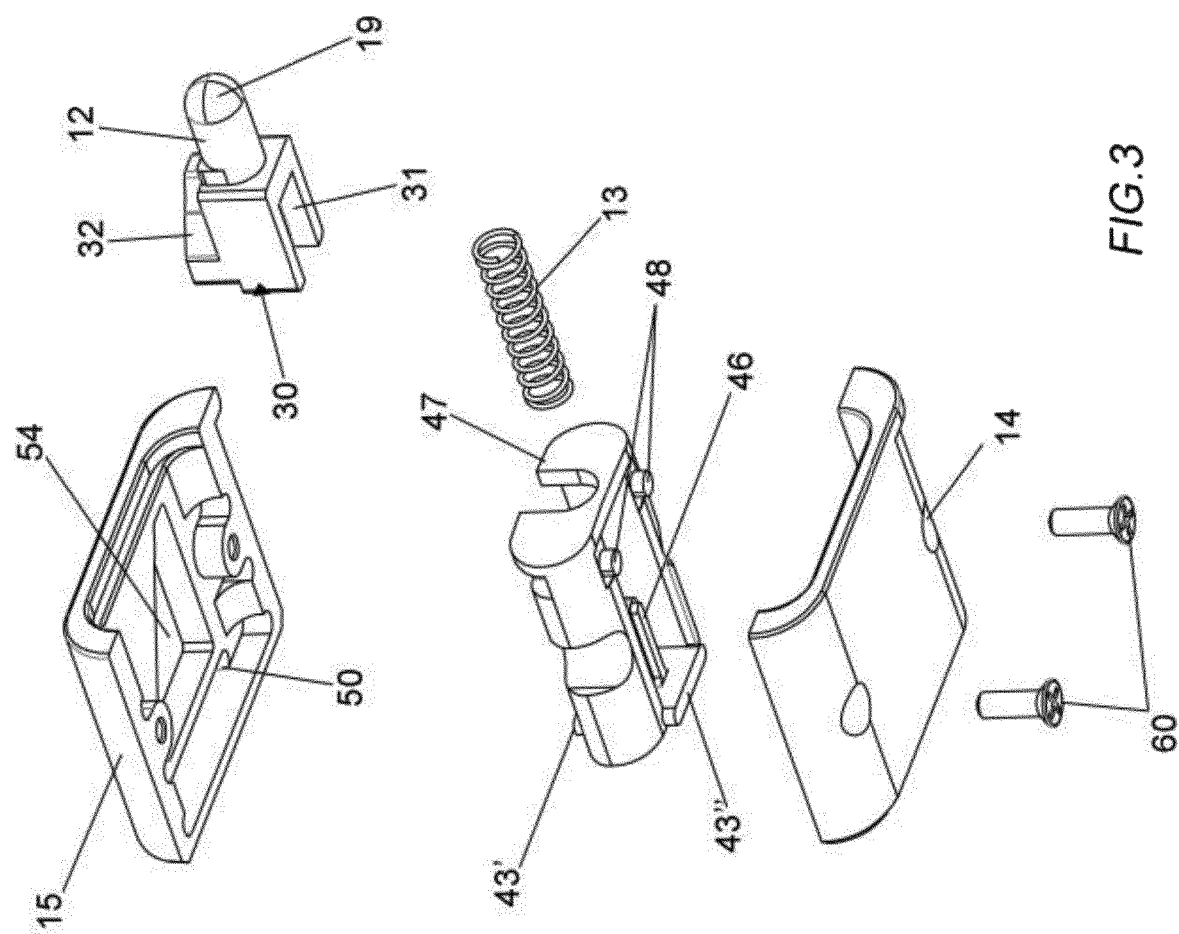

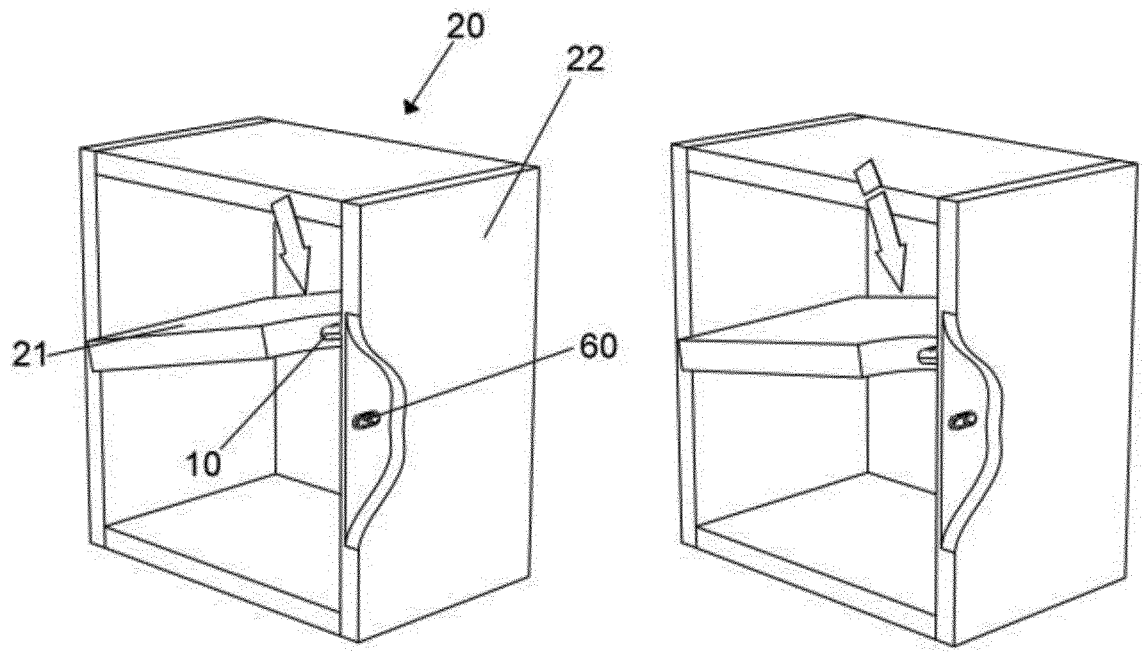
FIG.4bFIG.5b
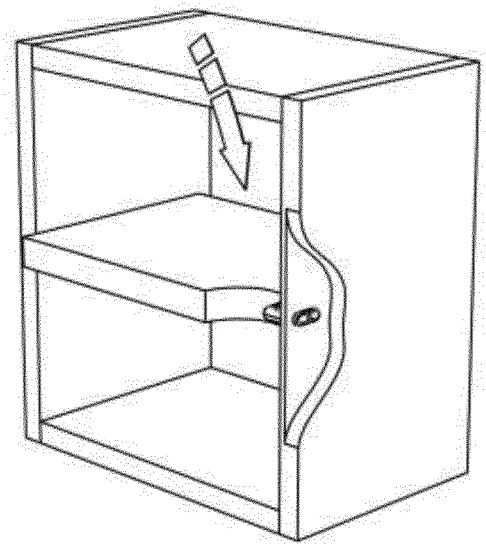
FIG.6b

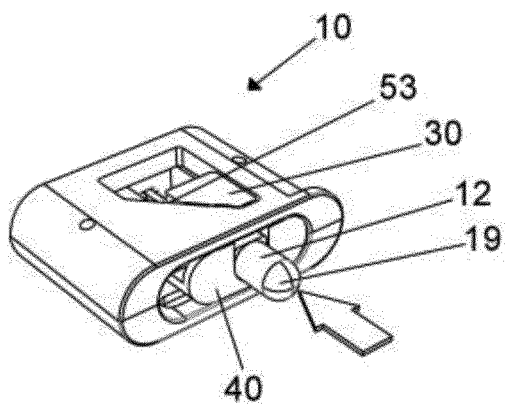
FIG.4'a
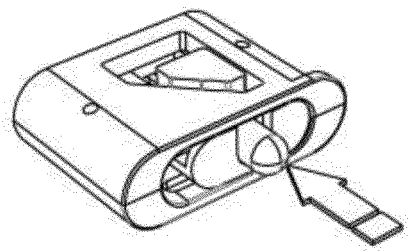
FIG.5'a
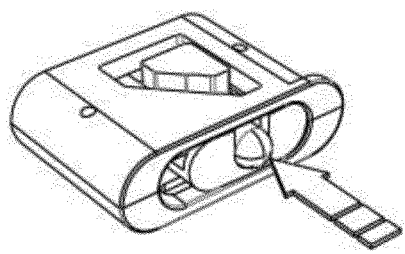
FIG.6'a
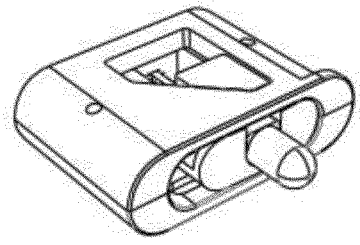
FIG.7'a

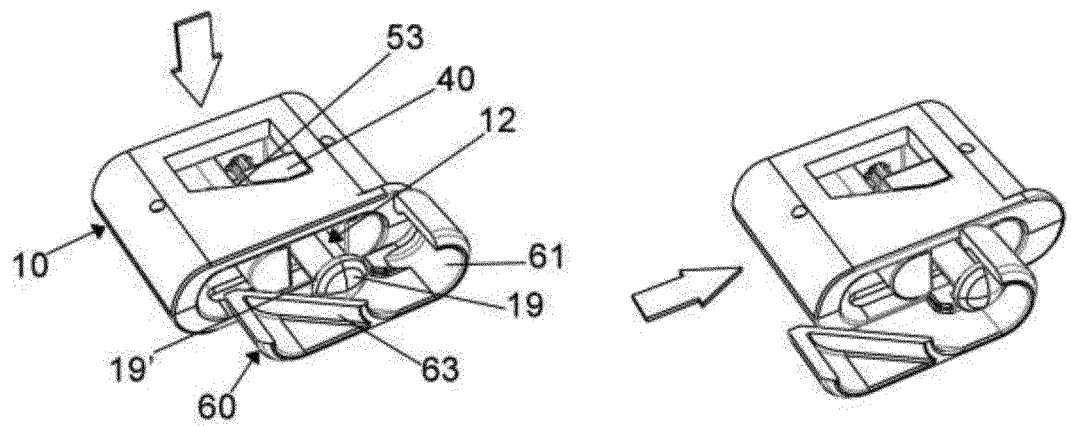
FIG.4'b            FIG.7'b
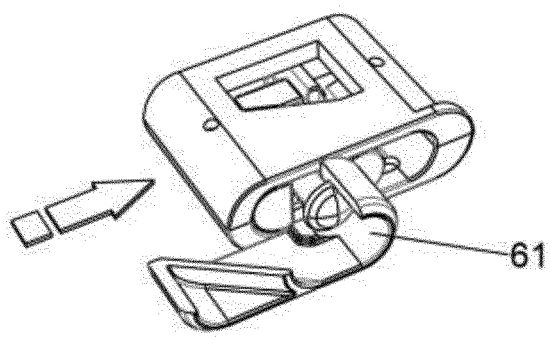
FIG.8'b

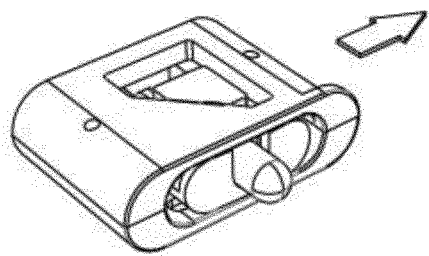
FIG.8'a
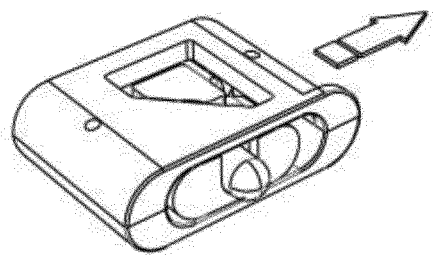
FIG.9'a
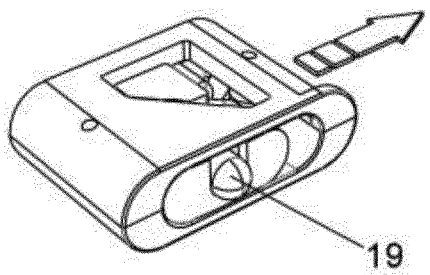
FIG.10'a
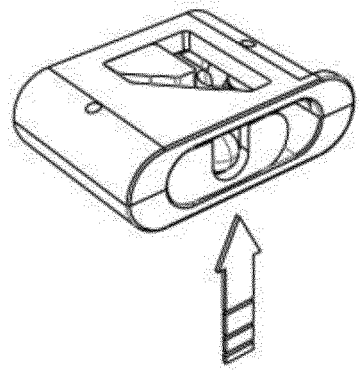
FIG.11'a

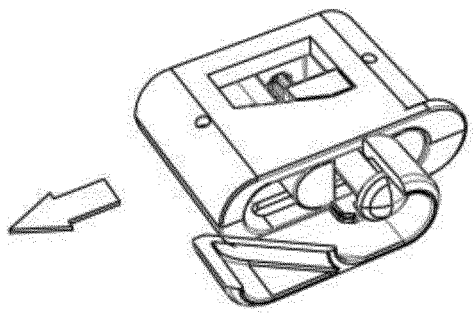
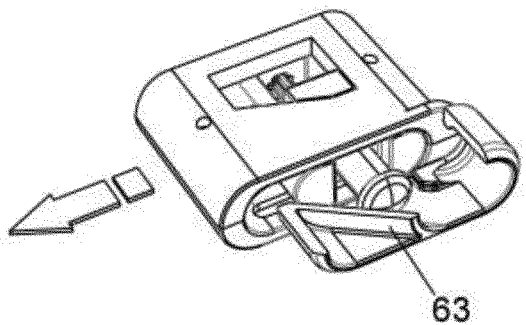
FIG.9'b             FIG.10'b
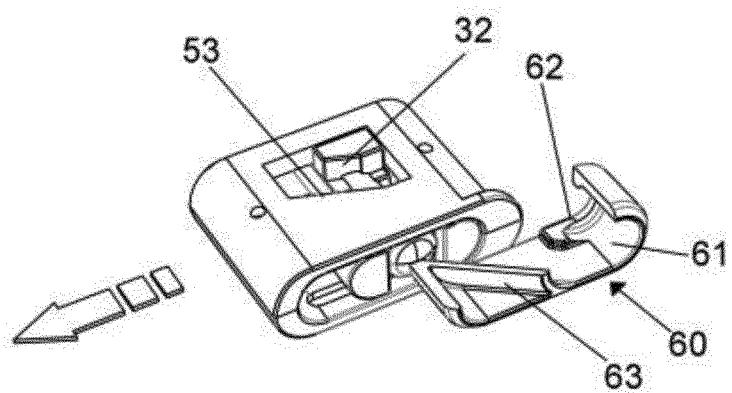
FIG.11'b

DEVICE FOR SUPPORT AND REMOVABLE FIXING OF SHELVES TO THE UPRIGHTS OF A FURNITURE ITEM

The present invention relates to a device for supporting and removably fixing shelves to the uprights of a piece of furniture.

Referring by way of example to a furniture item of the bookcase or shelf unit type, it typically comprises two uprights or vertical walls parallel one to the other, between which are interposed one or more horizontal shelves having the function of defining a support and resting surface for books, magazines, vases and/or other multiple and different objects.

The shelves are arranged and fixed between the vertical walls using means of various type, normally separate from the shelf, such as brackets, screws, pins and the like, which need to be mounted with special tools. This solution is not satisfactory—on the one hand because it makes assembly of the shelf rather laborious, and on the other hand because the means of fixing remain visible.

In order to seek to overcome these disadvantages, shelf-support devices have been proposed consisting of an elastic pin that is inserted into an edge of the shelf and has a protruding part that engages in a corresponding seat in a wall of the furniture item, under the action of a spring. The pin is normally protruding from the device, through the action of the spring and, when the shelf is assembled, it interferes with the vertical wall of the furniture item, returning into the device to snap out of it when it finds itself opposite the appropriate seat formed in the wall of the furniture item. To disassemble the shelf, a special tool must be used on the device, through an opening formed in the shelf, to cause the pin to retract against the action of the spring.

The international patent application PCT/EP2021/051855, not yet published, describes a device of this type in which a cam element is provided, which can be actuated with an appropriate key, for moving the pin between two positions of maximum and minimum extraction from the casing of the device, in which positions of maximum and minimum extraction it is free to spring in order to completely re-enter said casing under the action of an external thrust.

A device entirely similar in terms of functioning to the one just described is known from EP 3131438 B1.

These devices, although technically valid, have the disadvantage of requiring a special key for actuation of the cam, in order to move the pin between the positions of maximum and minimum extraction, an operation necessary both during the phase of assembly of the shelf and of possible removal of the same.

It is also necessary to form at least one hole in the shelf in order to access the seat of manoeuvre of the cam.

ITUA20162229A1 (IT102016000033671) describes a device for supporting shelves of furniture, housed in a seat provided in the shelf, comprising a casing inside of which is housed a containment body in which is inserted a pin moving axially in contrast to the action of a spring. The containment body is sliding along a slanting guide provided in the casing in such a way as to move obliquely with respect to the axis of the pin in order to pass from a deeper position to a less deep position, and vice versa, in the seat of the shelf, causing, respectively, a progressive extraction and a progressive re-entry of the pin.

A major disadvantage of this solution is that the spring, acting between the pin and the containment body, does not have any effect on the sliding of the latter which, among other things, needs to be brought manually into the "armed" position, shown for example in FIG. 3 of the patent, before the mounting of the shelf.

The object of the invention is to overcome the disadvantages mentioned above.

More particularly, an object of the present invention is to provide a device for supporting and fixing shelves of furniture that does not require any tools for assembling and disassembling the shelf.

Another object of the invention is to provide such a device that is completely invisible and therefore does not require the forming of holes in the visible parts of the shelf, so as to optimise the aesthetic value of the furniture item.

Yet another object of the invention is to provide such a device that allows easy and rapid assembly and disassembly of the shelf.

A further object of the present invention is to provide such a device that guarantees a stable fixing of the shelf.

Last but not least, it is an object of the invention to provide such a device configured in such a way that the elastic means provided therewith always keep it in an armed position for the mounting of the shelf.

These and other objects are achieved by the device of the invention that has the features disclosed in claim 1.

According to the invention, a device is provided for supporting and removably fixing shelves of furniture, such as bookcases, shelf units and the like, by means of a pin associated with a shelf and configured to be inserted in a hole formed in a side wall of an item of furniture, said device being configured to be inserted in the thickness of the shelf and comprising a casing, substantially flattened parallelepiped in shape, housing a carriage inside of which said pin terminating with a head is mounted, which is stressed by a compression spring, to protrude normally from the casing and so as to be able to re-enter completely into the casing with a linear displacement following a force exerted axially thereon, wherein said pin has a body sliding linearly in the carriage, without substantial transversal play, whereon at least one slanting plane is provided, co-operating with a corresponding slanting plane provided on the casing to cause a transversal sliding of the carriage, in a direction perpendicular to the axis of the pin, simultaneously to an oblique movement of the pin through the action of said spring or following a transverse force acting on the same with consequent exiting or re-entry, at least partial, of the pin in the casing.

Advantageous embodiments of the invention are disclosed by the dependent claims.

The constructional and functional features of the device for supporting and fixing shelves of the present invention will be made clearer by the following detailed description in which reference is made to the accompanying drawings which represent preferred and non-limiting embodiments thereof and wherein:

FIG. 1 schematically shows an axonometric view from above of a device for supporting and fixing furniture shelves according to a first embodiment of the present invention;

FIG. 2 is a blown-up axonometric view of the device of FIG. 1 taken from above;

FIG. 3 is a blown-up axonometric view of the device of FIG. 1 taken from below;

Figure 4:
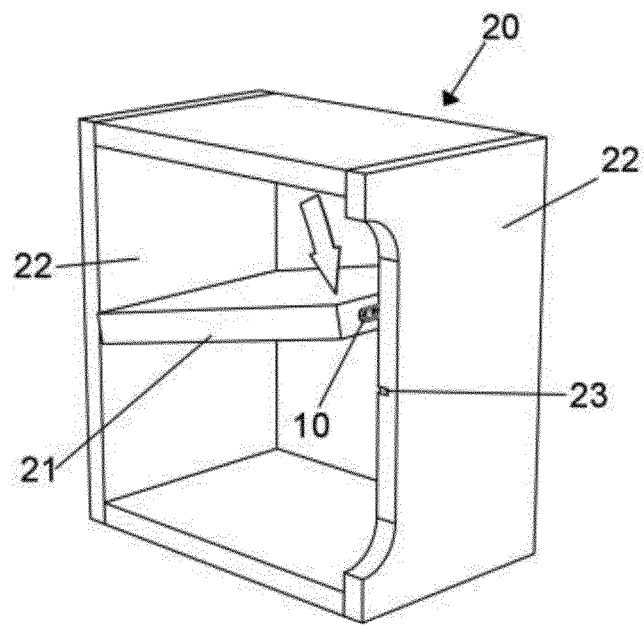
FIGS. 4, 5, 6, 7 are schematic views showing the sequence of steps during the assembly of a shelf.

FIGS. 4', 5', 6', 7' and 8', 9', 10', 11' are views like FIG. 1 showing the positions of the elastic pin during the sequences of steps of assembly and of disassembly of the shelf respectively;

FIGS. 4a, 5a, 6a, 7a, 8a, 9a, 10a, 11a, 4'a, 5'a, 6'a, 7'a, 8'a, 9'a, 10'a, 11'a are views similar to those of FIGS. 4-11', showing a second embodiment of the invention;

FIGS. 4b, 5b, 6b, 7b, 8b, 9b, 10b, 11b, 4'b, 7'b, 8'b, 9'b, 10'b, 11'b, are views substantially similar to those of FIGS. 4-11', showing a third embodiment of the invention.

Referring to FIGS. 1 to 11', a description is given of the first embodiment of the device for supporting and fixing furniture shelves according to the present invention, denoted overall by reference numeral 10. It comprises an outer casing 11 of a substantially flattened parallelepiped shape, inside whereof a pin 12 is mounted, terminating with an ogive or hemispherical head 19, which is stressed by a compression spring 13.

Naturally, the head 19 of the pin can have a different conformation from the ogive one, it being in any case preferable that it is rounded in order to have an easier sliding against the corresponding vertical wall of the furniture item, when it interferes with it during the insertion and the extraction of a shelf, as will be mentioned here below.

The flattened shape of the casing 11 allows the device 10 to be able to be inserted into a correspondingly shaped hole formed in the thickness of a shelf 21 of a furniture item (FIGS. 4-11) with the front surface of the casing 11 flush with the edge of the shelf, and the pin 12 protruding therefrom to be inserted in a hole 23 formed in a corresponding vertical wall 22 of the furniture item, as will be described in greater detail below.

The casing 11 is made in two half-shells, a lower half-shell or base 14 and an upper half-shell or lid 15 which, joined one to the other, determine the aforementioned flattened hollow parallelepiped conformation closed at one end 16 which is arranged in the thickness of the shelf 21 and open at the opposite end 17, from which the pin 12 protrudes.

The casing 11 may optionally be provided, at a section of the open end 17, with a collar 18 having the function of defining a stop element when it is introduced in said hole of the shelf.

The casing 11 is preferably made in plastic material or nylon or in another known equivalent material suitable for the purpose, not excluding metallic material, while the pin 12 is in metal or hard plastic. The spring 13 is conveniently metallic.

Referring now more particularly to the blown-up views of FIGS. 2 and 3, the mounting of pin 12 in casing 11 and the movement thereof during functioning of the device is illustrated.

The pin 12 protrudes at the front from a body 30, suitably shaped, also made in metal or hard plastic, sliding linearly along the axis of the pin 12 in a support frame 40, which will also be referred to as carriage in that provided with a transversal sliding, i.e. perpendicular, with respect to the axis of the pin 12, as will be seen here below.

The carriage 40, which has the shape of a rectangular frame, has two opposed side walls 41, 42, a rear wall 43 and a front wall 44 determining a seat 45 suitable for receiving, substantially without transversal play, the body 30 of the pin 12, with the spring 13 acting between said rear wall 43 and the body 30.

More particularly, according to the embodiment illustrated in the drawings, the spring 13 is partially housed in a cavity 31 formed in the body 30 and accommodates, on the opposite side, a stem 46 protruding from the rear wall 43 of the carriage 40.

Naturally, what is disclosed is purely by way of an example, it being possible to insert the spring 13 in a stem protruding at the rear from the body 30 and optionally act directly against the rear wall 43 of the carriage 40.

The front wall 44 of the carriage 40 has a window 47, which in the drawing is shown open above, but which could also be closed, for the passage of the pin 12.

For the transversal sliding of the carriage 40, its rear wall 43 has an upper projection 43' and a lower projection 43" suitable for being housed, respectively, in a guide rail 50 provided inside the upper half-shell 15 and in an opposed guide rail 51 formed in the lower half-shell 14. A further guide rail 52 is provided in the lower half-shell 14, in proximity of the front wall 17, suitable for housing a pair of feet 48 protruding below from the side walls 41, 42 of the carriage 40.

The two half-shells 14, 15 are assembled together, by means of screws 60, to form the shell 11, in which the carriage 40 slides transversally.

The transversal sliding of the carriage 40 in the shell 11 is determined by at least one pair of slanting planes provided, respectively, on the body 30 of the pin 12 and on one of the two half-shells 14, 15.

In the example shown in the drawings, merely for easier visualization, a slanting plane provided on the upper half-shell 15, denoted by reference numeral 53, is constituted by the oblique side of a window 54, substantially in the form of a rectangular trapezium/pentagon, formed in this half-shell.

It is however clear that the slanting plane 53 can be formed internally to the half-shell 15, which is moreover preferable, providing a simple protrusion that constitutes the slanting plane 53, or a recess in the thickness of the wall of the half-shell, which substantially reproduces the outline of the window 54.

A specular slanting plane could optionally be provided on the lower half-shell 14.

The body 30 of the pin 12 is shaped so as to present in its upper part a slanting plane, constituted by a small vertical wall 32, having the same slant as the slanting plane 53 so as to be able to slide thereon.

Naturally, a similar slanting plane will be provided in the lower part of the body 30 should a corresponding slanting plane be also provided on the lower half-shell.

With the structure of the device 10 described above, an axial thrust exerted on the pin 12 causes complete retraction thereof in the housing 11 in contrast to the action of the spring 13, by linear sliding of the body 30 in the rectangular seat 42 of the carriage 40, as illustrated in FIGS. 4' to 6', to which further reference will be briefly made here below.

Figure 7:
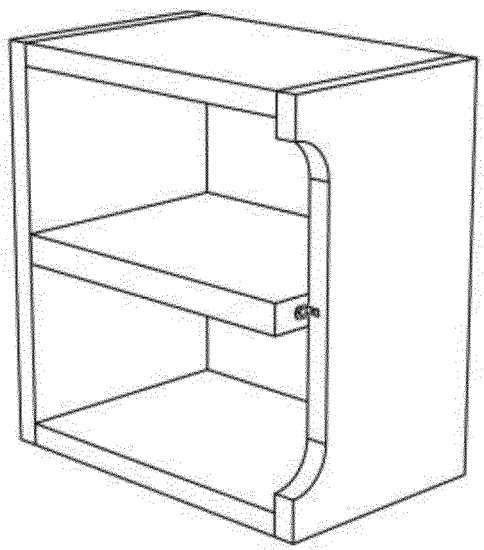
Figure 4A:
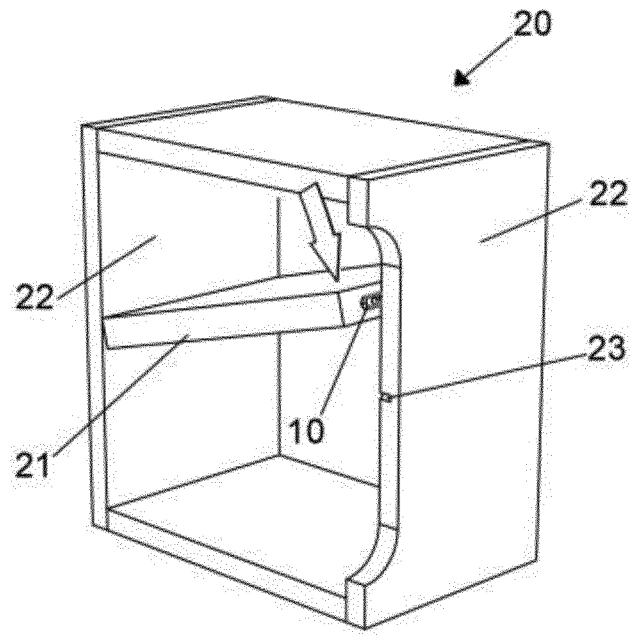
Figure 5A:
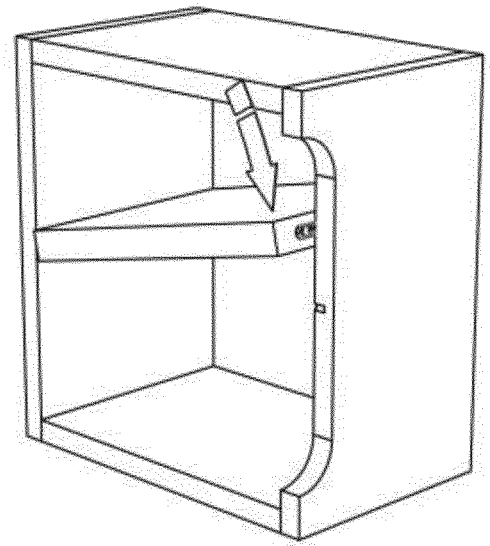
Figure 6A:
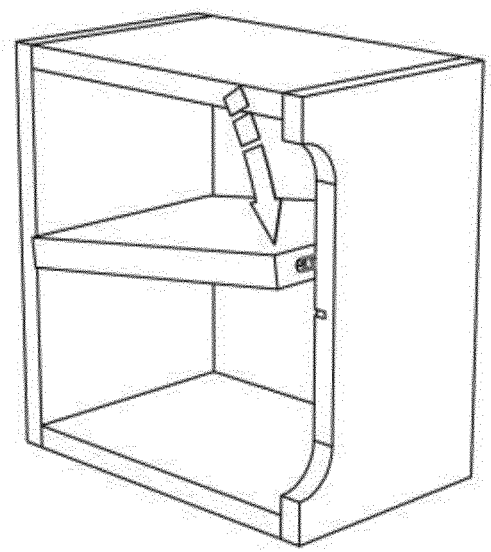
Figure 7A:
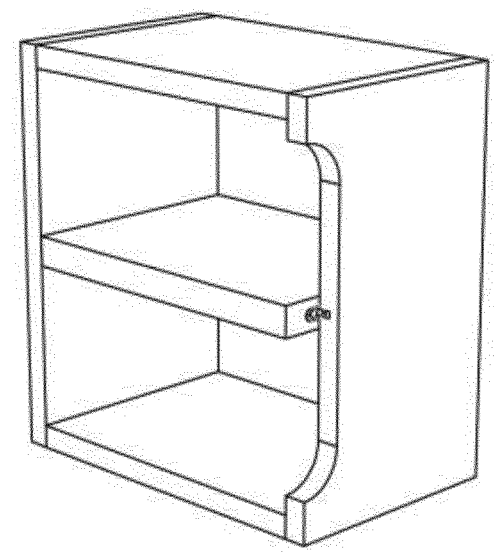

At the cessation of the thrust exerted on the pin 12, the action of the spring 13 causes exiting thereof from the casing 11, as shown in FIG. 7'.

Instead, a transverse force exerted on the pin 12 causes a sliding of the slanting plane 32 provided on the body 30 against the homologous slanting plane 53 provided on the shell 11, with consequent transversal displacement of the carriage 40 wherein the body 30 is housed without substantial transversal play. At the same time, the pin 12 returns to the casing 11, as shown in FIGS. 8' to 11', where the transverse force that acts on the pin is to be understood in the opposite direction to that indicated by the arrows shown therein.

Figure 11:
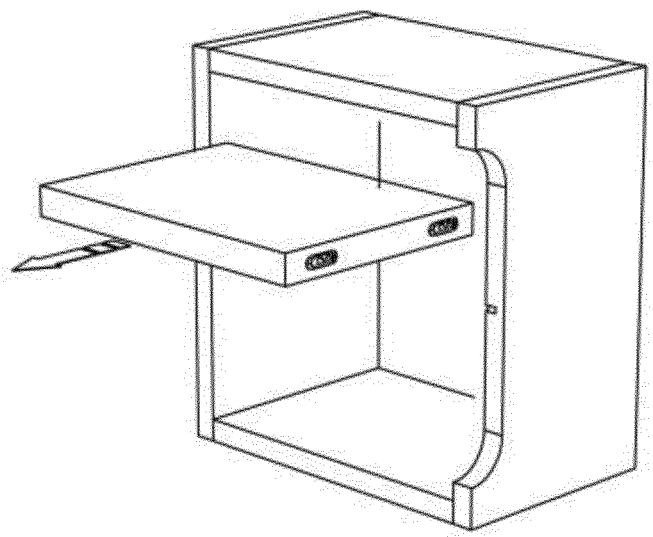
Figure 8A:
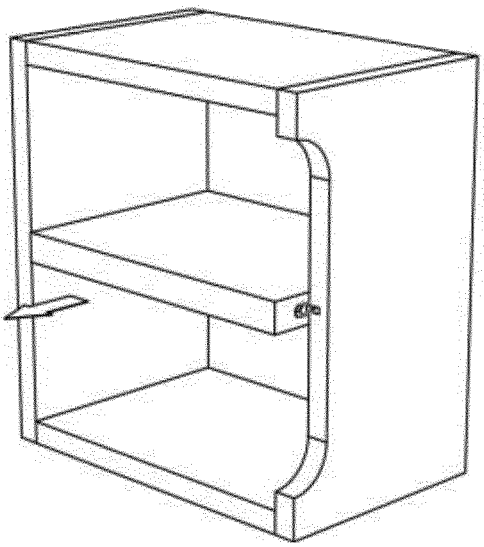
Figure 9A:
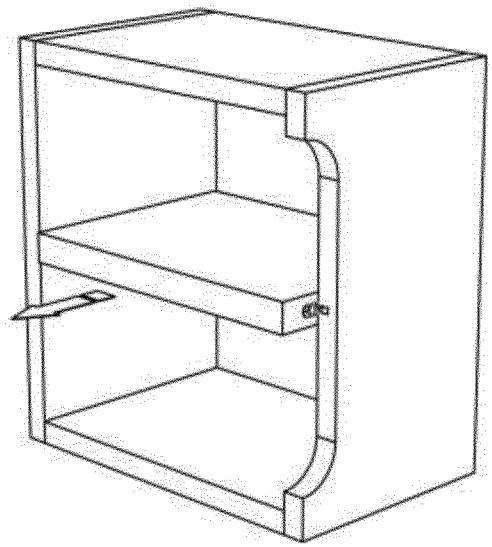

In this embodiment, the length of the slanting plane 53 provided on the half-shell 15 is such as to determine a stroke of the carriage 40 such as to cause the complete retraction of the pin 12 in the casing 11, including the ogive head 19, as shown in FIG. 11'.

When the transverse force exerted on the pin 12 ceases, the action of the spring 13 tends to return the pin 12 into the extracted position and therefore the carriage 40 into the starting position.

From what has been disclosed, the functioning of the device 10 in the phase of assembly and disassembly of a shelf 21 appears clear, which is however now briefly illustrated with reference to FIGS. 4 to 11 and 4' to 11'.

FIGS. 4 to 7 schematically show the steps of assembly of the shelf 21 which is provided with two pairs of devices 10 at two of its opposite sides.

In FIG. 4 the pins 12 of the devices 10 provided on the left side of the shelf 21 have been inserted in the corresponding holes 23 formed in the corresponding vertical wall 22 of the furniture item 20, and the shelf is tilted upwards.

Figure 5:
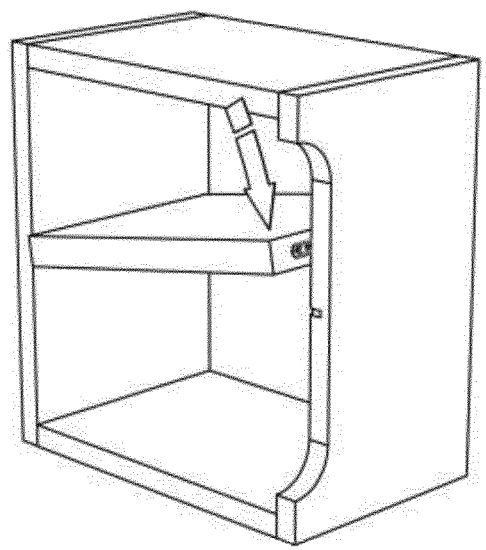
Figure 6:
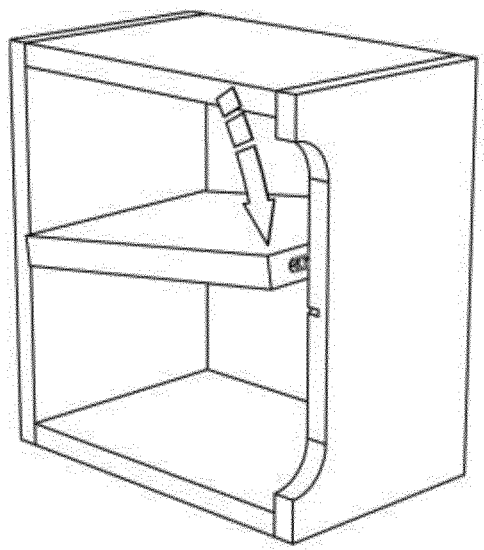

The following FIGS. 5 and 6 show the shelf that is lowered, as indicated by the arrows, bringing the pins 12 of the corresponding devices 10 into interference with the right vertical wall of the furniture item, along which they slide backwards, until coming into alignment with the corresponding holes 23 into which they snap under the action of the spring 13 (FIG. 7).

The backward movement and subsequent exit of the pin 12 from the casing 11 are shown in FIGS. 4' to 7', which correspond to the steps of assembly shown in FIGS. 4 to 7.

FIGS. 8 to 11 show the steps of disassembly of the shelf, which is pulled horizontally towards the exterior as indicated by the arrows. The transverse force exerted on each pin 12 by the edge of the corresponding hole 23 in which it is housed, during the extraction of the shelf, is obviously opposite to the direction indicated by the arrows, and in this opposite direction the carriage 40 will move through the action of the slanting planes, until causing the complete re-entry of the pin 12 with its ogive head 19 in the shelf 21 and subsequent exit through action of the spring 13 when the shelf has been extracted (FIG. 11).

Figure 10:
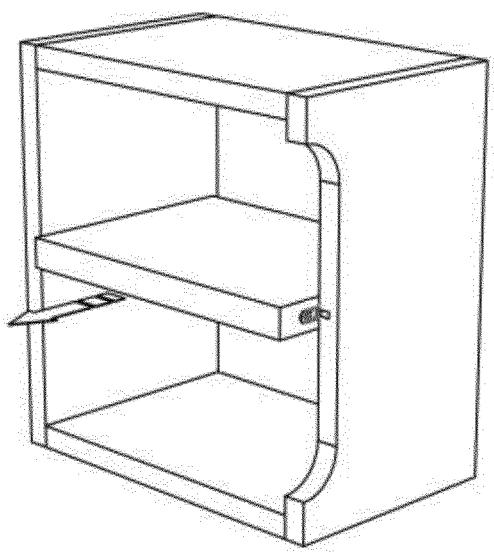

FIGS. 8' to 11' show the movement of the carriage 40 from the position of maximum extraction of the pin 12 (FIG. 8') corresponding to the condition of assembled shelf of FIG. 8, up to the completely retracted position in the casing 11 (FIG. 11') corresponding to the condition wherein the pin has come out from the respective hole 23 and abuts against the wall 22 of the furniture item as shown in FIG. 10. With the shelf (FIG. 11) completely extracted, the spring 13 causes the exiting of the pin and the simultaneous translation of the carriage 40, which moves into the position shown, for example, in FIG. 7'.

It should be noted that the positions of the carriage 40 shown in FIGS. 8' to 11' correspond to an extraction of the shelf in the opposite direction to that shown in FIGS. 8 to 11.

From what has been disclosed, the advantages of the invention, which allows rapid assembly and disassembly of shelves of furniture, without having to use tools of any kind and without having to form any holes in the visible parts of the shelves, as is necessary with similar devices of the prior art, are clear.

Referring now to FIGS. 4a to 11'a, a second embodiment of the invention is briefly described using the same reference numerals of the previous embodiment to distinguish identical or corresponding parts.

The device 10 of this second embodiment is practically identical to that of the first embodiment, from which it is distinguished by a shorter length of the slanting plane 53 provided on the upper half-shell 15.

Therefore, a detailed description of the device, to which all the considerations previously made apply in full, will be omitted, with only an illustration of the different function that can be attributed to the shorter length of the abovementioned slanting plane 53, the effect of which is to determine a shorter stroke of the carriage 40 and not to completely retract the pin 12 into the casing 11 when a transverse force is exerted on the pin in the phase of removal of the shelf.

Therefore, the steps of assembly of the shelf, shown in FIGS. 4a to 7a, and the corresponding positions of the pin 12, shown in FIGS. 4'a to 7a, are identical to the corresponding steps of assembly of the first embodiment.

Figure 10A:
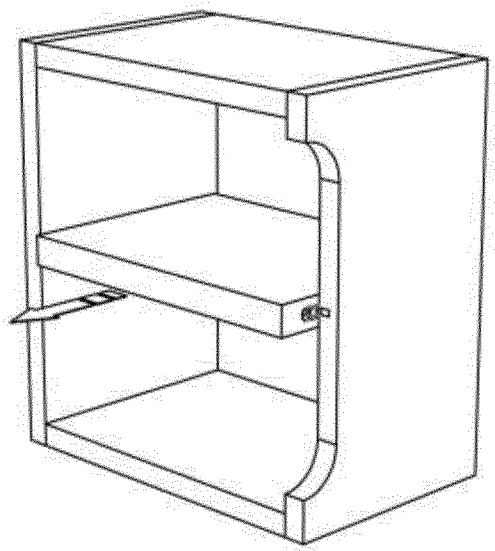

In the phase of extraction of the shelf, pulling it horizontally towards the exterior, the latter remains locked in the position of FIG. 10a, at the end of the stroke of the carriage 40, due to interference of the ogive head 19 of the pin 12 protruding from the casing 11 (FIG. 10'a) in the corresponding hole 23.

Figure 11A:
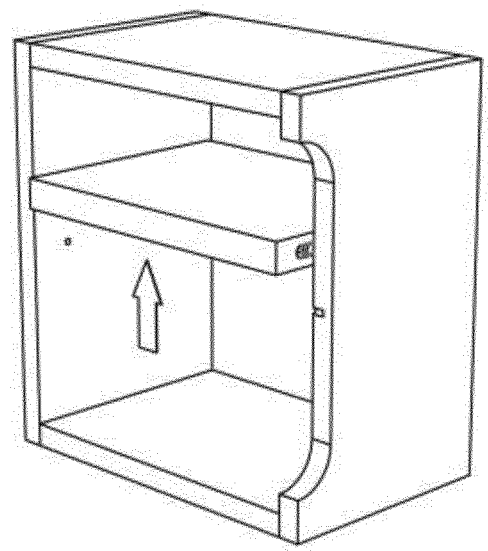
Figure 8:
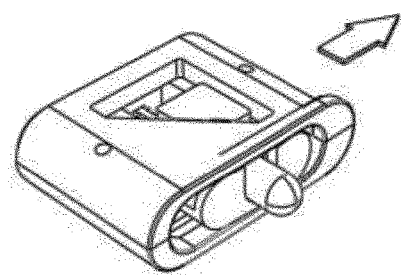
Figure 9:
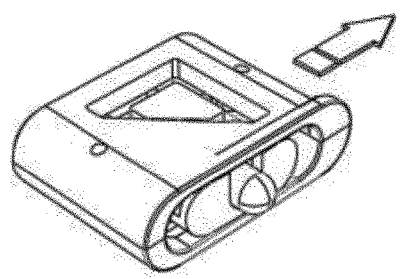
Figure 10:
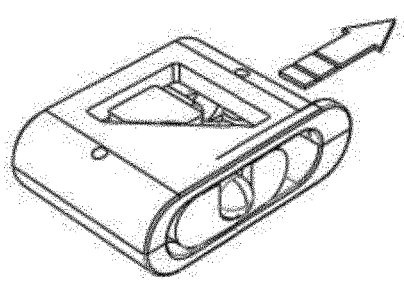
Figure 11:
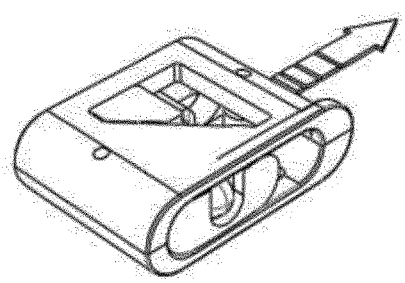
Figures 9B, 10B:
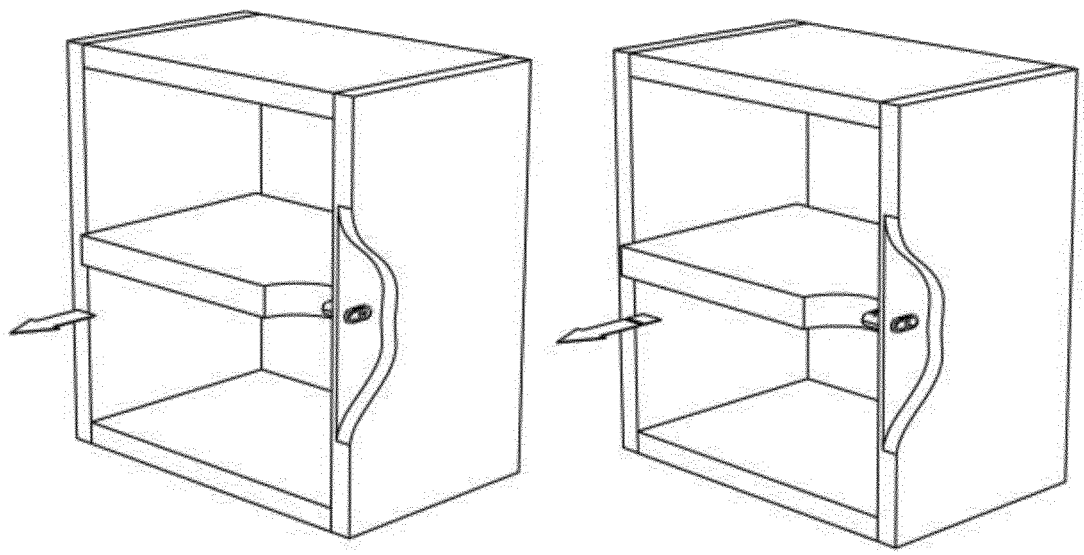
Figure 11B:
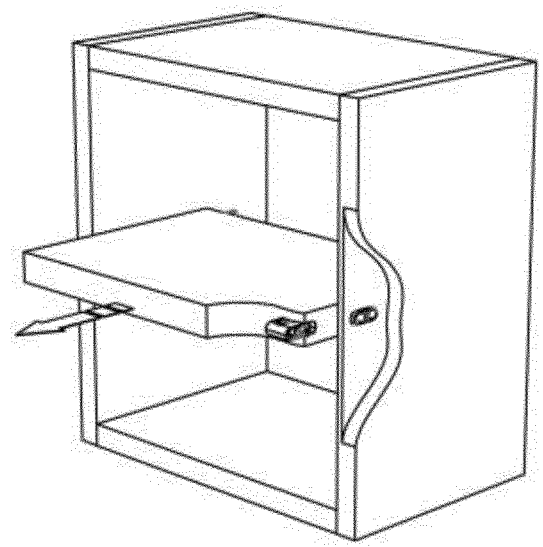

At this point, in order to be able to completely retract the pin 12 into the casing 11 and remove the shelf 21, it is sufficient to exert a vertical force thereon, for example upwards, as shown in FIGS. 11a, 11'a, sliding the head 19 against the edge of the corresponding hole 23 formed in the wall of the furniture item.

The incomplete retraction of the pin 12 in the casing 11 during the extraction of the shelf may be useful to prevent the shelf from falling under the action of its own weight when the pins exit from the corresponding holes.

FIGS. 4b, 5b, 6b, 7b, 8b, 9b, 10b, 11b, 4'b, 7b, 8'b, 9'b, 10'b, 11'b illustrate a third embodiment of the invention, which will be described in brief using again the same reference numerals to distinguish identical or corresponding parts.

The device 10 is substantially the same as that of the previous embodiments, except for a different conformation of the head 19 of the pin 12, which still maintains a rounded shape, but is enlarged with respect to the pin, so as to determine an internal collar 19'.

In addition, a bushing 60 is provided, which partially reproduces the profile of the casing 11 and which is placed in a slotted hole, with horizontal orientation, provided in the side wall 22 of the furniture item.

The bushing 60 has a cradle conformation presenting, at one end (which will be referred to as rear with reference to the direction of insertion of the shelf), a substantially semi-cylindrical seat 61 with a front shoulder 62, which is arranged flush with the wall 22.

At the other (front) end of the bushing 60 a vertical slanting plane 63 is provided, oriented towards the interior of the bushing.

According to this embodiment, the assembly of the shelf 21, once arranged with the devices 10 provided therein in vertical alignment with the corresponding bushings inserted in the side walls of the furniture item, is carried out by lowering it so that the head 19 of each pin 12 is compressed against the wall 22 until it clicks into the corresponding bushing 60, as shown in FIGS. 4b, 5b, 6b and 4'b.

Figure 7B:
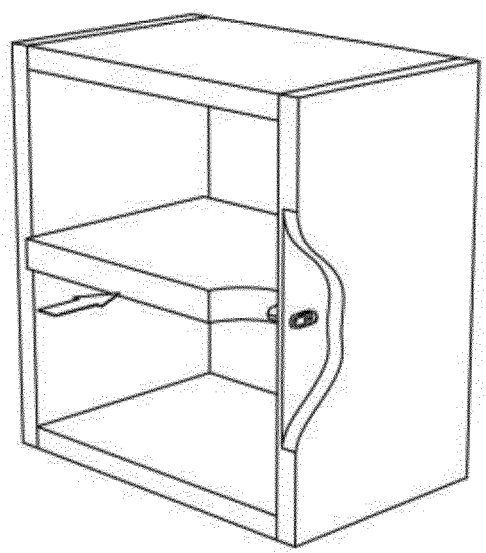

Subsequently the shelf 21 is pushed horizontally as indicated by the arrow in FIG. 7b and the head 19 of the pin 12 enters the seat 61 of the bushing as shown in Figure 7b.

Figure 8B:
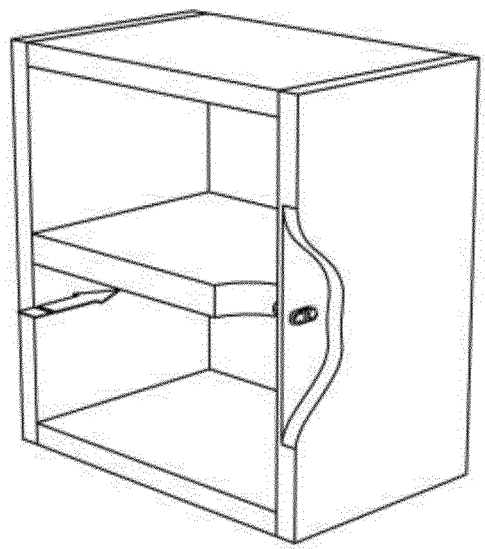
FIGS. 8, 9, 10, 11 are views showing the sequence of steps during the disassembly of the shelf.
Figure 4:
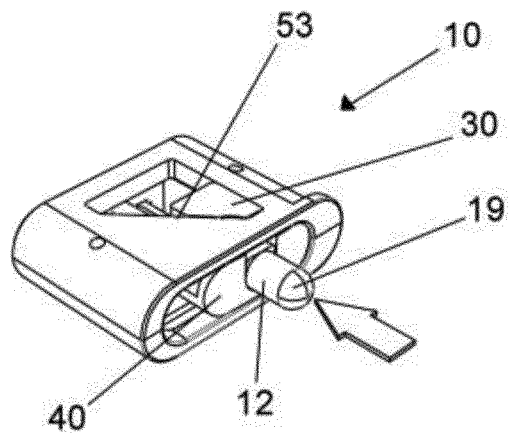
Figure 5:
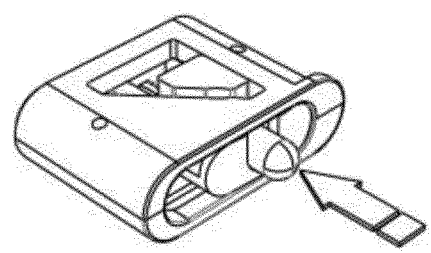
Figure 6:
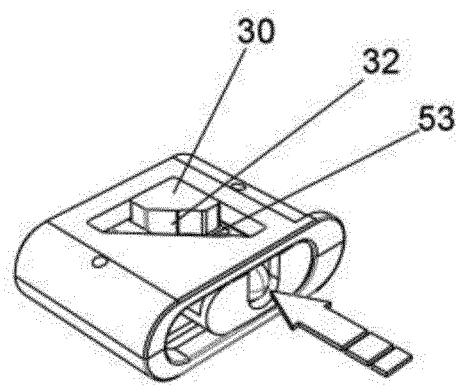
Figure 7:
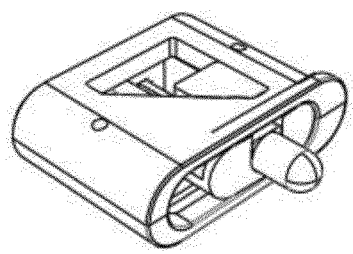
Figure 8:
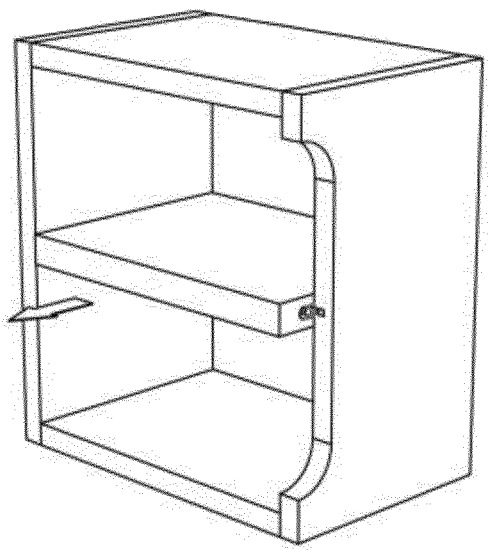

Continuing to push the shelf 21 as indicated by the arrow in FIG. 8b, the interference of the head 19 of the pin 12 against the edge of the seat 61 causes the movement of the carriage 40 through sliding of the slanting plane 32 provided on the body 30 of the pin against the slanting plane 53 on the casing 11, with consequent retraction of the head 19, whose collar 19' stably engages with the shoulder 62, as shown in FIG. 8'b.

The disassembly of the shelf takes place by extracting it horizontally in the opposite direction to that of insertion, as shown by the arrows in FIGS. 9b to 11b.

Figure 9:
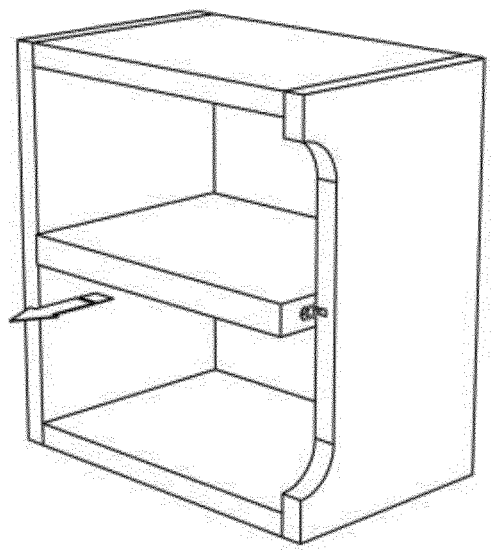

Initially the head 19 comes out from the casing 11 through the action of the spring 13, disengaging itself from the shoulder 62 (FIG. 9'b).

Subsequently, the head 19 comes out from the seat 61 and rests on the slanting plane 63 of the bushing, sliding on the same and starting to retract into the casing 11 (FIG. 10'b) until it is completely retracted (FIG. 11'b) to allow the extraction of the shelf.

Although the invention has been described above with particular reference to the embodiments thereof given purely by way of a non-limiting example, numerous modifications and variations will appear clear to a person skilled in the art in light of the description given above. The present invention, therefore, is intended to embrace all modifications and variations that come within the scope of the following claims.

The invention claimed is:

1. A device for supporting and removably fixing furniture shelves comprising a pin associated with a shelf and configured to be inserted in a hole formed in a side wall of a piece of furniture, said device being configured to be inserted in the shelf and comprising a casing, substantially flattened parallelepiped in shape, housing a carriage inside of which said pin terminating with a head is mounted, which is stressed by a compression spring, to protrude normally from the casing and so as to be able to re-enter completely into the casing with a linear displacement following a force exerted axially thereon, wherein said pin has a body sliding linearly in the carriage, without substantial transversal play, whereon at least one slanting plane is provided, co-operating with a corresponding slanting plane provided on the casing to cause a transversal sliding of the carriage, in a direction perpendicular to the axis of the pin, simultaneously to an oblique movement of the pin through the action of said spring or following a transverse force acting on the pin with consequent exiting or re-entry of the pin in the casing.

2. The device according to claim 1, wherein said at least one slanting plane provided on the casing is constituted by an oblique side of a window, substantially in the shape of a rectangular trapezium/pentagon, formed in the casing.

3. The device according to claim 1, wherein said at least one slanting plane provided on the casing comprises a protrusion, or a recess in the wall of the casing.

4. The device according to claim 1, wherein said at least one slanting plane provided on the casing has a length such as to determine a stroke of the carriage so as to cause the complete retraction of the pin in the housing, including the head, or a partial retraction, leaving at least the head out, following a transverse force exerted on the pin.

5. The device according claim 1, wherein said casing is made in two half-shells, a lower half-shell or base and an upper half-shell or lid which, joined together, determine the aforementioned flattened hollow parallelepiped conformation closed at one end which is arranged in the thickness of the shelf and open at the opposite end, from which the pin protrudes.

6. The device according to claim 5, wherein said carriage has at least one upper protrusion suitable for housing in a transversal guide rail provided inside said upper half-shell and/or at least one lower protrusion suitable for housing in a corresponding transversal guide rail formed in said lower half-shell.

7. The device according to claim 1, wherein said head of the pin is widened with respect to the pin, so as to define an internal collar able to engage with a bushing (60) arranged in a hole provided in a side wall of the piece of furniture.

8. The device according to claim 7, wherein said bushing has, at one end, a substantially semicylindrical seat with a front shoulder, for engaging the head of the pin, while at the other end of the bushing a vertical slanting plane is provided, oriented towards the interior of the bushing, against which said head slides in a phase of extraction of the shelf to cause the pin to retract in the housing.

* * * * *